United States Patent Office 2,778,730
Patented Jan. 22, 1957

2,778,730

PLUTONIUM ALLOY AND METHOD OF SEPARATING IT FROM URANIUM

Frank H. Spedding and Thomas A. Butler, Ames, Iowa, assignors to the United States of America as represented by the United States Atomic Energy Commission No Drawing. Application September 29, 1944, Serial No. 556,498

15 Claims. (Cl. 75—122.7)

This invention relates to the separation of uranium and/or plutonium from metallic compositions. It is frequently found that separation of uranium from metallic compositions containing this element in the metallic state is quite difficult particularly where the uranium is present in a preponderant amount and where it is desired to remove metals from the uranium which are present in only small amounts for example of less than 25 percent by weight of the uranium.

The problem is particularly acute when applied to the recovery of plutonium, the transuranic element having a mass number of 239 and an atomic number of 94, since the element is usually produced in extremely small concentrations generally not in excess of about 0.00001 to 0.05 percent by weight of the uranium.

It has been established that when uranium is bombarded with neutrons, there is formed a variety of products of nuclear fission including one or several members of a light group of atomic numbers 35 to 46 inclusive and also of a heavy group of atomic numbers 51 to 60 and, in addition, a new element having an atomic number of 93 and an atomic weight of 239 which subsequently decays by beta decay to a second new element having an atomic number of 94 and an atomic weight of 239. This second new element is known as plutonium (symbol Pu). As a general rule, only small quantities of plutonium are formed (less than 0.1 percent of the uranium), and as plutonium resembles uranium very closely in many of its chemical and physical characteristics, the discovery of a relatively simple process for the recovery of plutonium from the uranium mass has been exceedingly difficult.

An object of the present invention is to separate uranium from compositions containing metallic uranium and another metal.

Another object of the present invention is to provide a simple means and method for separating plutonium from the large amount of uranium normally associated with it.

Other objects will become apparent from consideration of the following description.

In accordance with the present invention, we have found that plutonium may be separated to a substantial degree from uranium by melting the uranium with a metal in which plutonium is preferentially soluble or which preferentially associates, adsorbs or otherwise takes up plutonium, preferably using an amount of the other metal sufficient to cause separation of a phase comprising plutonium, generally in increased concentration, and the other metal. This phase may be separated from the uranium and used as such or subjected to further treatment for recovery of plutonium.

We have found that small quantities of many metals such as tin, copper, bismuth, silver or gold exert a preferential action for removal of plutonium. For example, as little as 2 to 5 percent of tin, when melted with neutron-irradiated uranium, removes as much as 85 to 90 percent by weight of the plutonium and upon cooling of the melt, the plutonium-rich tin phase separates in the form of solid dendrites dispersed in the uranium. These dendrites or other phases which separate may be recovered in a simple manner as hereinafter described and a plutonium concentrate is thus secured. This plutonium may be present as an alloy or solid solution and/or dispersion in the added metal.

Generally it is found desirable to use an amount of metal just sufficient to remove plutonium in more concentrated form, since the addition of unnecessary metal merely serves to dilute the composition and plutonium is then removed in a less concentrated form. Consequently the amount of plutonium-removing metal should be substantially less than the amount of uranium subjected to treatment and rarely should exceed 20 percent by weight of the uranium. The metals may be melted together by any convenient method. For example the uranium and other metal may be melted together, or the tin or similar metal may be added to a molten pool of neutron-irradiated uranium.

The form in which the plutonium-rich phase separates out depends to a substantial degree upon the nature and quantity of metal used. Where tin is used, the tin phase generally separates upon cooling as dendrites dispersed in a uranium mass. On the other hand when copper or silver is used, the mixture stratifies and the plutonium-copper or plutonium-silver phase may be removed either by tapping off this layer in the molten state or by permitting the stratified composition to solidify and separating the layers.

Frequently the problem of separating uranium from the dendrites or other solid phases present in a composition such as herein described is found to be rather complex, particularly where an accurate separation is desired.

In accordance with a further modification of the present invention it has been found that a satisfactory removal of uranium from uranium metal compositions containing other metallic components may be effected by converting the uranium or at least a substantial portion thereof to uranium hydride or nitride leaving the other metals substantially unhydrided or unnitrided; or if hydrided or nitrided to some degree the hydrides of these other metals are in a form due to physical and/or chemical characteristics such as to permit a ready separation. The hydrided or nitrided product is surprisingly more amenable to treatment to effect an adequate separation of the uranium and the other metal phases than the untreated metallic compositions. It has been found that the reactivity of hydrogen with uranium is so great that a selective conversion of the uranium to hydride may be secured without substantial effect upon numerous metals with which the uranium may be associated.

The essentially selective reaction for the production of hydride may be effected by controlling the temperature at a suitably low level, for example of 200 to 250° C., or up to 300° C. and the hydrogen pressure at a sufficiently low level of, for example, 3 to 150 millimeters absolute pressure so that it reacts rapidly with the uranium without substantial effect upon other metals which do not react or which react very slowly at the temperatures of operation. A suitable process of hydrogenating uranium is described in copending application for United States Letters Patent of Amos S. Newton, Serial No. 546,178, filed July 22, 1944, entitled Method of Preparing Uranium Hydride, now Patent No. 2,446,780, issued August 10, 1948. The hydrogenated material thus formed should be cooled in an atmosphere of hydrogen to prevent dissociation thereof and then if not processed at once is preferably kept in an inert atmosphere of nitrogen or carbon dioxide on account of its pyrophoric nature. However it may be processed cold in air without hazard immediately after cooling. Uranium hydride is much lighter and bulkier than uranium, and where it has been formed from uranium metal which is substantially free from oxide parting planes, it does not adhere to the uranium surface but falls to the bottom of the reactor as it is formed. As a result, the hydrogen will react rapidly and substantially completely with massive uranium free or substantially free from internal oxide parting planes. It has been discovered that massive uranium, prepared by sintering or otherwise bonding uranium powder together, contains internal oxide parting planes and reacts to form only a coating of the hydride which adheres to the surface and prevents further reaction until it has been removed.

Thus it is usually preferable to subject uranium which is substantially free from oxide parting planes to neutron bombardment if the plutonium is to be removed as herein contemplated. Uranium suitable for this process may be prepared by heating a mixture of UF$_4$ with metallic magnesium or calcium to reaction temperature, permitting reaction to occur to form molten uranium and maintaining the uranium in the molten state for a time sufficient to permit uranium to separate as a molten pool from the magnesium or calcium fluoride formed and other impurities collecting as a slag layer which may be removed from the metal. This reaction is conducted in a bomb or other reactor in which oxygen or air may be excluded. Uranium so produced is in massive form, has a melting point below 1200° C., a density above 18 and is substantially free from oxide.

During hydrogenation the plutonium-rich phase is substantially unaffected by the hydrogen and remains in its metallic state. As a result, after treatment of the mass with hydrogen the plutonium-rich phase may be separated from the hydride by taking advantage of the differences in chemical and/or physical properties of the components. For example, the product which usually is in a crumbled form containing finely divided hydride and coarser particles of the unhydrided plutonium concentrate, may be separated by sieving flotation or other classification method. The uranium hydride separated may be decomposed by heating in an atmosphere of hydrogen at 400–500° C. and the metallic uranium recovered may be used for the production of additional plutonium.

In accordance with a further modification, the hydrogen-reacted product may be treated with a solvent which selectively dissolves the hydride or the plutonium concentrate. The nature of the solvent used will be determined by the metal used to concentrate the plutonium. Thus where tin has been used, the mixture of hydride and tin-plutonium component may be extracted with a 2 to 3 normal HCl solution, suitably at an elevated temperature, for example of about 90° C., to remove the tin and plutonium leaving the hydride behind. Sulphuric acid and other nonoxidizing acids of concentrations up to 2 or 3 normal may be used in a similar manner. Where gold is used to remove the plutonium, the mixture of uranium hydride and gold may be treated with silver nitrate solution in order to dissolve the uranium and leave the gold unaffected.

In a similar manner, the hydrided uranium may be removed from other metals by selectively converting the uranium hydride to a water-soluble chloride, bromide or sulphate or other water-soluble salt using reagents of relatively low acidity to prevent attack of the unhydrided component, or by using an oxidizing agent, such as silver nitrate, and converting the uranium to the uranyl state to form a water-soluble uranyl compound, such as uranyl nitrate. Other solutions such as antimony chloride (SbCl$_3$), silver acetate, mercurous nitrate, etc. may be used to convert the uranium hydride to a water-soluble state and permit removal thereof. Numerous other oxidizing agents, particularly weak oxidizing agents capable of oxidizing metallic or hydrided uranium to hexavalent or tetravalent uranium, including silver perchlorate and silver tartrate, may be used in a similar manner.

As previously pointed out, uranium hydride is difficult to handle due to its pyrophoric nature. This difficulty can be overcome however by converting the uranium hydride to uranium nitride. The nitride is a comparatively stable substance that can be handled readily in the air without serious danger of fire or explosion. This conversion can be carried out by treating the uranium hydride with ammonia, NH$_3$, at a relatively low temperature of, for example, 200°–350° C. The uranium hydride is converted by this process to uranium nitride having a formula corresponding approximately to UN, and the nitride so formed may be separated by sieving, flotation or other classification process or by a suitable preferential extraction process.

In accordance with a further modification, the uranium metal can be directly converted to the nitride by treatment with ammonia. This process of direct treatment of uranium with ammonia however may require a considerably longer time to go to completion where the temperature of nitride formation is maintained at a low level.

If desired, uranium metal or uranium hydride can be treated with ammonia at elevated temperatures such as 800° C., to 1000° C. to form a nitride having a composition corresponding approximately to the formula U$_4$N$_7$. This high-temperature nitride is similar to the low-temperature nitride, UN, in many of its physical and chemical characteristics.

When the uranium hydride or the uranium metal is converted to nitride, the plutonium-rich phase is not affected and remains in its metallic state. Accordingly, it can be separated from the nitride by physical means such as sieving or flotation or by chemical means such as acid leaching which dissolves the plutonium concentrate and leaves the nitride substantially unaffected.

The plutonium-tin or other metal concentrate obtained contains plutonium in a concentration substantially greater than that present in neutron-irradiated uranium. Usually the concentration is at least 3 to 5 times the plutonium concentration of neutron-irradiated uranium based upon the total metal content of the concentrate. The plutonium may be further concentrated by suitable means such as by precipitation or adsorption from solution or by other methods.

The following examples are illustrative:

*Example 1.*—5.27 parts by weight of metallic tin was melted with 107 parts by weight of neutron-irradiated uranium containing about 200 milligrams of plutonium per ton of uranium. The uranium itself was substantially free from oxide, had a melting point of 1100±25° C. and had a density of 19±0.1. After mixing the molten mass until the components were well mixed the mixture was permitted to cool and solidify. The solidified tin-uranium alloy appeared to be scattered throughout the unalloyed uranium metal mass in the form of dendrites of substantial size. The mass was placed in a chamber, the chamber evacuated and flushed with hydrogen, and the temperature of the chamber was raised to 250° C. Hydrogen was introduced at a rate sufficient to maintain the hydrogen pressure at about 25 mm. of mercury absolute pressure. Upon conversion of the uranium to the hydride the dendrites were unaffected and remained as coarse particles which were separated by sieving. Approximately 10 parts by weight of a fraction which failed to pass a 270-mesh screen was secured. This fraction contained about 50 percent of the plutonium initially in the uranium and also contained about 78 percent by weight of uranium and 20 percent by weight of tin. Similar results may be secured when the uranium is converted to nitride.

*Example 2.*—The process of Example 1 was repeated using 101 parts by weight of irradiated uranium and 2.6 parts by weight of bismuth in lieu of tin. 5 parts by weight of a fraction which failed to pass a 270-mesh screen was secured. This fraction contained approximately 20 percent of the plutonium.

*Example 3.*—100 parts by weight of neutron-irradiated uranium metal and 4.6 parts by weight of metallic tin were melted, cooled and reacted with hydrogen as described in Example 1. The mass was leached with 2 normal HCl in a carbon dioxide atmosphere at 80 to 90° C. for one hour. 92 percent of the plutonium was dissolved with about 13 percent of the uranium and 70 percent of the tin.

*Example 4.*—The process of Example 1 was repeated forming the uranium hydride as therein described. Thereafter gaseous NH$_3$ was led into the chamber while the temperature was maintained at 250° C. and the hydride was converted to nitride. This nitride was separated by the method of Example 1.

*Example 5.*—The process of Example 1 was repeated using 14 parts by weight of silver and 86 parts by weight of the uranium, a very sharp line between phases separating the top cap of silver from the uranium metal mass was found. The mixture was hydrogenated as in Example 1. The cap was not affected by the hydrogenation. 82 percent of the plutonium initially in the uranium was concentrated in the silver cap, along with 98 percent of the silver and 3 percent of the uranium. Analysis of the cap showed it to be 89.5 percent silver and 9.2 percent uranium.

When copper is used as an alloying metal the copper-uranium alloy forms a separate phase that collects at the top of the uranium mass. This phase is disintegrated on hydrogenation, due to the presence of some free uranium in the copper-uranium composition. The copper-uranium compound however can be substantially separated by sieving, it contains an appreciable concentration of the plutonium. However, the degree of removal of plutonium by means of this metal is not as high as may be achieved with the use of tin, silver or bismuth.

Combinations of various metals can be used with advantage to form alloys that will remove plutonium from uranium. Silver-gold and silver-tin have been found to be good alloying combinations. A combination of silver and gold is particularly good since it seems to retain the good separability of the silver alloy and the high plutonium adsorption of the gold alloy.

Both the silver-gold and the silver-tin alloys form separate phase caps on top of the uranium metal. In the case of the silver-gold alloy, a substantial amount of the cap is insoluble in nitric acid. Since this insoluble fraction contains most of the plutonium, a substantial concentration of the plutonium may be effected even without recourse to the hydrogenation step. The following example illustrates a suitable method for the use of metal combinations to remove plutonium.

*Example 6.*—The following composition was prepared:

| | Parts by weight |
|---|---|
| Ag | 12.95 |
| Au | 0.86 |
| Uranium containing plutonium | 86.1 |

The mixture was heated in one atmosphere of helium at 1350° C. for 3 minutes and allowed to cool and stratify. The cooling was caused to take place at a slow rate to enable the light silver phase to separate completely. The product after solidification was then subjected to the action of hydrogen as in Example 1. The silver cap did not disintegrate during this treatment. The remainder crumbled and was sifted through 200- and 300-mesh sieves. Analyses were run on the fractions including the cap, plus 200-mesh, 200–300 mesh and minus 300-mesh fractions. The cap itself was analysed to determine the composition of its HNO$_3$-soluble and -insoluble components. Results are shown in the following table:

*Composition of fraction*

| Fraction | Percent U | Percent Ag | Percent Au | Percent of Total | | | |
|---|---|---|---|---|---|---|---|
| | | | | U | Ag | Au | Pu |
| Cap | 20.0 | 75.9 | 1.5 | 4.33 | 97.1 | 69.6 | 91.3 |
| HNO$_3$ Soluble | 19.2 | 75.4 | .035 | 4.17 | 98.5 | 1.85 | 76.9 |
| Insol | 23.6 | 17.0 | 34.4 | .16 | .57 | 67.8 | 14.3 |
| −180 mesh | 70.8 | 22.8 | 1.02 | .86 | 1.63 | 2.71 | 2.95 |
| 180–300 mesh | 93.6 | 4.05 | .74 | 2.94 | .75 | 5.05 | 2.65 |
| −300 mesh | 97.3 | 0.069 | .11 | 91.8 | .38 | 22.7 | 3.28 |

This process was repeated using one part by weight of tin, 15 parts by weight of silver and 85 parts by weight of irradiated uranium. The results are shown in the following table:

*Composition of fraction*

| Fraction | Percent Sn | Percent Ag | Percent U | Percent of Total | | |
|---|---|---|---|---|---|---|
| | | | | Ag | U | Pu |
| Cap | 2.0 | 76.7 | 18.4 | 98.2 | 4.58 | 87 |
| −200 mesh | 4.0 | 18.4 | 72.8 | 1.33 | 1.07 | 3.4 |
| 200–325 mesh | 1.2 | 1.44 | 91.4 | .37 | 4.88 | 0.93 |
| −325 mesh | .35 | 0 | 97.7 | 0 | 89.2 | 8.7 |

While the invention has been described with particular reference to the modification involving separation of the uranium by reaction with hydrogen and/or ammonia it is not limited to such a method. Thus the uranium may be separated by selective extraction of the uranium or the plutonium-rich phase by a solvent. Moreover the plutonium-rich fraction may be separated by gravity and drawn off in the liquid state, or the melt may be allowed to solidify and the plutonium rich layer may be recovered simply by breaking up the solidified aggregate and separating the stratified components. This process is particularly effective with silver alloys.

Moreover the process herein described for removal of uranium by conversion to hydride or nitride is not limited to processes for recovery or concentration of plutonium but may be applied to separation of uranium from other alloys or metallic phases in the presence or absence of plutonium. For example misch metal or other rare earth metals may be separated from uranium by conversion of uranium to hydride or nitride as herein contemplated. The hydrided uranium may be removed from the misch metal or other rare earth metal or its hydride by the methods herein described.

Although the present invention has been described with particular reference to the specific details of certain embodiments thereof, it is not intended that such details shall be regarded as limitations upon the scope of the invention except insofar as included in the accompanying claims. This application is generally related to the subject matter described and claimed in a copending application for United States Letters Patent Serial No. 556,499 filed September 29, 1944, by Thomas A. Butler, in which separation of the uranium hydride or nitride by chemical means is being claimed, whereas this instant application contains generic claims and claims restricted to the species of separation by mechanical means.

We claim:

1. The method of recovering plutonium contained in a large quantity of uranium which comprises melting with the uranium from 2 to 5 percent of tin, cooling the mass, converting the free uranium in the resultant mass to uranium hydride, and separating the hydride from the plutonium-tin phase.

2. A method of recovering plutonium from uranium that comprises melting with the uranium an amount of silver and gold sufficient to form a separate plutonium-rich phase and separating the plutonium-rich phase.

3. A method of recovering plutonium from uranium that comprises melting with the uranium a small amount of silver and gold sufficient to form a separate plutonium-rich phase, permitting the mass to solidify, treating the resultant mass with hydrogen to convert the free uranium to uranium hydride, and separating the uranium hydride from the silver-gold phase.

4. A method of recovering plutonium contained in a large quantity of uranium, which comprises melting with the uranium mixture 2 to 20% by weight of tin; cooling the mass; converting the free uranium phase in the resultant mass to a compound selected from the group consisting of uranium hydride and uranium nitride; and separating said uranium compound from the uranium-tin phase enriched with regard to plutonium.

5. A process for recovering plutonium contained in a large quantity of uranium, comprising melting with said uranium-plutonium mixture 2 to 20% by weight of tin with regard to uranium, whereby two distinct phases are formed, one of said phases consisting of uranium-tin alloy carrying the bulk of said plutonium and said other phase consisting essentially of metallic uranium; contacting the batch containing said two phases with hydrogen gas whereby said hydrogen reacts with said uranium phase to form uranium hydride, whereas said alloy phase remains unaffected by said hydrogen; cooling the heterogeneous hydride-alloy mixture; and separating said hydride from said alloy by mechanical means.

6. A process for recovering plutonium contained in a large quantity of uranium, comprising melting with said uranium-plutonium mixture 2 to 20% by weight of tin with regard to uranium, whereby two distinct phases are formed, one of said phases consisting of uranium-tin alloy carrying the bulk of said plutonium and said other phase consisting essentially of metallic uranium; contacting the batch containing said two phases with hydrogen gas of from 3 to 150 mm. Hg absolute pressure at a temperature ranging from 200 to 300° C., whereby said hydrogen reacts with said uranium phase to form uranium hydride, whereas said alloy phase remains unaffected by said hydrogen; cooling the hydride-alloy mixture; and separating said hydride from said alloy by mechanical means.

7. The method of claim 6 in which the hydriding temperature is between 200 and 250° C.

8. A process for recovering plutonium contained in a large quantity of uranium, comprising melting with said uranium-plutonium mixture from 2 to 20% by weight of tin with regard to uranium, whereby two distinct phases are formed, one of said phases consisting of uranium-tin alloy carrying the bulk of said plutonium and said other phase consisting essentially of metallic uranium; contacting the batch containing said two phases with hydrogen gas of from 3 to 150 mm. Hg absolute pressure at a temperature ranging from 200 to 300° C., whereby said hydrogen reacts with said uranium phase to form finely divided uranium hydride whereas said alloy phase remains unaffected by said hydrogen, and in a coarser distribution; cooling the hydride-alloy mixture; and separating the said finely divided hydride from said coarse alloy by sieving.

9. A process for recovering plutonium contained in a large quantity of uranium, comprising melting with said uranium-plutonium mixture from 2 to 20% by weight of tin with regard to uranium, whereby two distinct phases are formed, one of said phases consisting of uranium-tin alloy carrying the bulk of said plutonium and said other phase consisting essentially of metallic uranium; contacting the batch containing said two phases with hydrogen gas having an absolute pressure of from 3 to 150 mm. Hg at a temperature ranging from 200 to 300° C., whereby said hydrogen reacts with said uranium phase to form uranium hydride whereas said alloy phase remains unaffected by said hydrogen; cooling the hydride-alloy mixture; and separating said hydride from said alloy by flotation.

10. A process for recovering plutonium contained in a large quantity of uranium, comprising melting with said uranium-plutonium mixture from 2 to 20% by weight of tin with regard to uranium, whereby two distinct phases are formed, one of said phases consisting of uranium-tin alloy carrying the bulk of said plutonium and said other phase consisting essentially of metallic uranium; contacting the batch containing said two phases with hydrogen gas having an absolute pressure of from 3 to 150 mm. Hg at a temperature ranging from 200 to 300° C., whereby said hydrogen reacts with said uranium phase to form uranium hydride, whereas said alloy phase remains unaffected by said hydrogen; contacting said mass with ammonia gas at a temperature of from 200 to 350° C., whereby said hydride is converted to nitride; cooling the nitride-alloy mixture; and separating said nitride from said alloy by mechanical means.

11. A process for recovering plutonium from neutron-irradiated uranium, comprising melting with about 100 parts by weight of said uranium approximately 5 parts by weight of tin, whereby two distinct phases form, one of said phases consisting of a uranium-tin alloy carrying the bulk of said plutonium and said other phase consisting essentially of metallic uranium; contacting the batch containing said two phases with hydrogen having an absolute pressure of about 25 mm. of mercury at a temperature of approximately 250° C. whereby said hydrogen reacts with said uranium phase to form uranium hydride whereas said alloy phase remains unaffected by said hydrogen; cooling the hydride-alloy mixture; and separating said hydride from said alloy by mechanical means.

12. A process for recovering plutonium from neutron-irradiated uranium, comprising melting with about 100 parts by weight of said uranium approximately 5 parts by weight of tin, whereby two distinct phases form, one of said phases consisting of a uranium-tin alloy carrying the bulk of said plutonium and said other phase consisting essentially of metallic uranium; contacting the batch containing said two phases with hydrogen having an absolute pressure of about 25 mm. of mercury at a temperature of approximately 250° C. whereby said hydrogen reacts with said uranium phase to form uranium hydride; introducing ammonia gas into said mass while maintaining it at 250° C. whereby said hydride is converted to nitrile; cooling the nitride-alloy mixture; and separating said nitride from said alloy by mechanical means.

13. A process for separating a metallic uranium phase from a phase of uranium-tin alloy, comprising contacting said two phases with hydrogen gas at a temperature of from 200 to 300° C. whereby said hydrogen gas reacts with said uranium phase to form uranium hydride, whereas said alloy phase remains unaffected by said hydrogen; cooling the heterogeneous hydride-alloy mixture; and separating said hydride from said alloy.

14. A process for separating a metallic uranium phase from a phase of uranium-tin alloy, comprising contacting said two phases with hydrogen gas at a temperature of from 200 to 300° C. whereby said hydrogen gas reacts with said uranium phase to form uranium hydride, whereas said alloy phase remains unaffected by said hydrogen; contacting said mass with ammonia gas at a temperature of from 200 to 350° C. whereby said hydride is converted to nitride; cooling the heterogeneous nitride-alloy mixture; and separating said nitride from said alloy.

15. A uranium-tin-plutonium alloy containing about

78% by weight of uranium, about 20% of tin, and plutonium.

References Cited in the file of this patent

UNITED STATES PATENTS

| | | |
|---|---|---|
| 2,136,549 | Hensel et al. | Nov. 15, 1938 |
| 2,197,380 | Hensel et al. | Apr. 16, 1940 |
| 2,206,634 | Fermi et al. | July 2, 1940 |

OTHER REFERENCES

Hackh's Chemical Dictionary, by Grant, 3rd edition, page 667, 1944.